Patented Sept. 20, 1932

1,877,884

UNITED STATES PATENT OFFICE

GEORG KALISCHER, OF FRANKFORT-ON-THE-MAIN, HEINRICH RITTER, OF FRANKFORT-ON-THE-MAIN-FECHENHEIM, HEINZ SCHEYER AND OTTO BAYER, OF FRANKFORT-ON-THE-MAIN, GERMANY, ASSIGNORS TO GENERAL ANILINE WORKS, INC., OF NEW YORK, N. Y., A CORPORATION OF DELAWARE

DYESTUFFS OF PYRAZOLANTHRONE SERIES AND PROCESS OF MAKING SAME

No Drawing. Application filed July 15, 1930, Serial No. 468,198, and in Germany July 20, 1929.

This invention relates to new valuable fast vat dyestuffs for cotton and to a process for making same.

The new dyestuffs are obtained by condensing a 2—carboxylic acid halide of pyrazolanthrone compounds with a cyclic ketone compound containing at least one free amino-group which ketone is capable of being vatted and may be a dyestuff. The acylated products thus obtained are valuable dyestuffs, which can be transformed into soluble vats by means of an alkaline hydrosulfite solution and which dye cotton therefrom fast shades varying according to the starting material used.

It is a very surprising fact in spite of the introduction of the high molecular anthraquinone residues to which in 1- and 9-position a heterocyclic ring system is linked the condensation products formed yield easily soluble vats.

As suitable amino-derivatives of cyclic ketone compounds capable of being vatted α-mono- and diamino-anthraquinones, amino-anthrimides and their carbazolic derivatives, amino-anthanthrones, amino-pyranthrones, amino-dibenzanthrones, amino-dibenzopyrenquinones, and their substitution products and derivatives, amino-thiazolanthrone-sulfone and amino-coeramidonines may be mentioned. The condensation is carried out in a suitable solvent such as nitrobenzene or dichlorobenzene with or without the addition of an agent binding the hydrohalic acid formed by the reaction.

Pyrazolanthrone-2-carboxylic acid chloride and its N-alkyl- and N-aralkyl-derivatives which are used as starting materials for the production of dyestuffs are easily obtainable by the usual conversion of the corresponding carboxylic acids.

Instead of starting from the N-alkyl- or N-aralkyl-derivatives of the pyrazolanthrone-2-carboxylic acid chloride the same result is obtained by converting the acylation products of the pyrazolanthrone-2-carboxylic acid chloride into the alkylated and aralkylated derivatives by a subsequent treatment with suitable alkylating or aralkylating agents.

The same analogous products are obtained by condensing 1-halogen-anthraquinone carboxylic acid halides with the aforesaid aminoderivatives of cyclic ketones and reacting with hydrazine on the condensation products thus obtained. In a striking manner the ring closure to the pyrazolanthrone derivatives immediately occurs without the formation of intermediates. The condensation with hydrazine may be advantageously carried out by treating the components under pressure with the addition of a suitable solvent such as pyridine or in an aqueous suspension and using hydrazine hydrate or sulfate with the addition of the corresponding quantity of alkali.

When using according to this latter modification 1-halogen-anthraquinone-2-carboxylic acid halides for the condensation with amino compounds of the aforesaid kind the same dyestuffs are obtained as by condensing pyrazolanthrone-2-carboxylic acid halides. When starting from the isomeric 1-halogenanthraquinone-4-carboxylic acid halides however, the present process takes place in the same way and fast vat dyestuffs are also formed.

In order to further illustrate our invention the following examples are given, the parts being by weight and all temperatures in centigrade degrees, but it is to be understood, that our invention is not limited to the particular products nor reacting conditions mentioned therein:—

Example 1

22 parts of 1-aminoanthraquinone are mixed with about 750 parts of nitrobenzene and 28 parts of pyrazolanthrone-2-carboxylic acid chloride and the mixture is heated to boiling until no unchanged 1-amino-anthraquinone can be detected. When cool the separated mass of crystals is filtered off and washed out with benzene. The new dyestuff thus obtained corresponds to the probable formula:

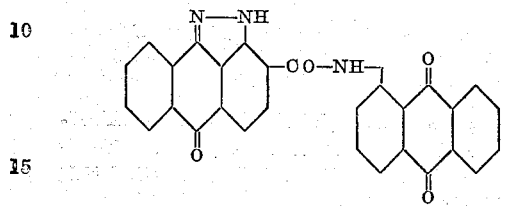

It forms yellow crystals and dyes cotton from a violet-reddish brown vat strong yellow shades of a good fastness. The solution in concentrated sulfuric acid is orange colored.

The same dyestuff is obtained in the following manner: 10 parts of 1-chloro-2-anthraquinone-carboxylic acid-α-anthraquinone-amide of the formula:

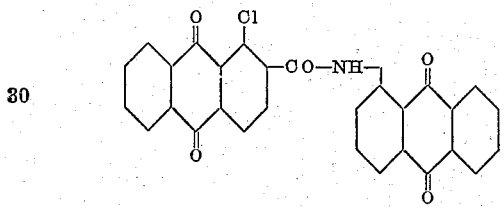

are heated with 100 parts of anhydrous pyridine in an apparatus provided with a reflux condenser and 3 parts of hydrazine hydrate are allowed to drop in. After boiling for a short time the formed dyestuff is filtered off and is washed out with alcohol. It may be purified, for instance, by boiling with hypochlorite.

The latter method of condensation may be carried out likewise as follows:—

10 parts of 1-chloro-2-anthraquinone-carboxylic-acid-α-anthraquinone amide are suspended in about 250 parts of water and the aqueous paste is mixed with 5 parts of hydrazine sulfate and a sufficient quantity of alkali and the mixture is heated for about 4 hours in an autoclave at about 130°. The dyestuff separates in the form of yellowish brown flakes.

When condensing 4- and 5-chloro-pyrazolanthrone-2-carboxylic acid chloride with 1-amino-anthraquinone, similar dyestuffs of strong tinctorial power are obtained.

Example 2

12 parts of 1.5- or 1.4-diamino-anthraquinone are heated with 28 parts of pyrazolanthrone-2-carboxylic acid chloride in the presence of nitrobenzene in the manner as described in the first paragraph of Example 1. The dyestuffs thus obtained correspond to the probable formulæ:

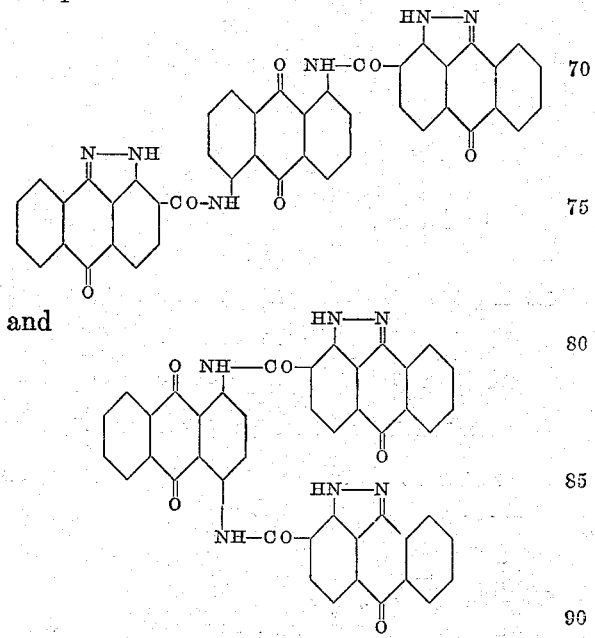

respectively. They correspond in their properties with the dyestuff of Example 1 and dye cotton yellow shades of a good fastness.

Example 3

25 parts of 1-amino-4-methoxy-anthraquinone are mixed with about 1000 parts of dichlorobenzene and 28 parts of pyrazolanthrone-2-carboxylic acid chloride and the mixture is heated to boiling in an apparatus provided with a reflux condenser until the evolution of hydrochloric acid has ceased. The dyestuff thus formed separates as orange-brown crystals. It corresponds probably to the formula:

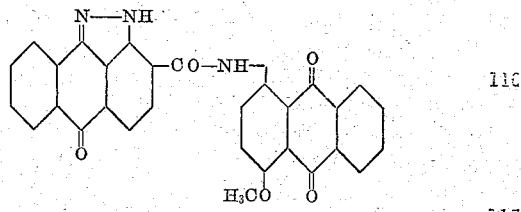

It dyes cotton from a black-brown vat the same shade turning to a full orange when exposed to the air. The solution of the new dyestuff in concentrated sulfuric acid is dark red.

Example 4

35 parts of 1-amino-4-benzoylamino-anthraquinone are mixed with about 1250 parts of nitrobenzene and 28 parts of pyrazolanthrone-2-carboxylic acid chloride and 10 parts of anhydrous sodium acetate and the mixture is heated for ½ hour to boiling in an apparatus provided with a reflux condenser. The reaction product separating in the form of reddish brown crystals is filtered off and washed out with alcohol and water. The new dyestuff corresponds probably to the formula:

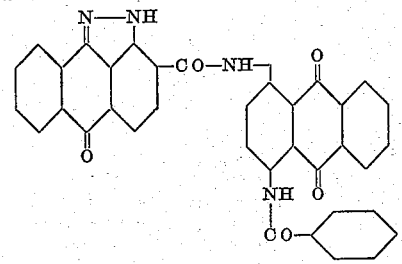

It is soluble in concentrated sulfuric acid with an orange red color and dyes cotton from a brownish red vat full orange-brown shades of a good fastness.

The same dyestuff is obtained in the following manner: 1-chloro-2-anthraquinone-carboxylic acid-1'-benzoylamino-4'-anthraquinone-amide of the formula:

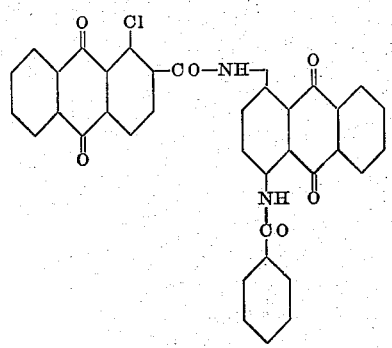

is condensed with hydrazine hydrate in a like manner as described in the second paragraph of Example 1.

*Example 5*

30 parts of N-methyl-pyrazolanthrone-2-carboxylic acid chloride are mixed with about 1000 parts of dichlorobenzene and 23 parts of 1-amino-anthraquinone and the mixture is heated to boiling in an apparatus provided with a reflux condenser until the evolution of hydrochloric acid has ceased. The reaction product separating in form of yellowish brown crystals is filtered off and washed out. It corresponds probably to the formula:

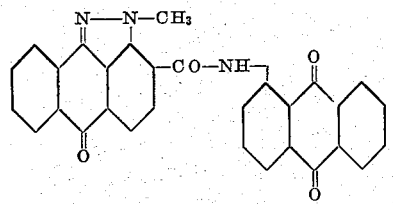

The new dyestuff dyes cotton from a reddish brown vat yellow shades of a good fastness.

When replacing the 23 parts of 1-amino-anthraquinone- by 25 parts of 1-amino-4-methoxy-anthraquinone or 33 parts of 1-amino-4-benzoylamino-anthraquinone analogous dyestuffs are obtained dyeing cotton from a black-reddish brown vat full orange to orange-brown shades of a good fastness.

*Example 6*

10 parts of the dyestuff described in paragraph 1 of Example 1 are mixed with 10 parts of toluene-sulfonic-acid-methylester, 8 parts of potassium carbonate and about 75 parts of nitrobenzene and the mixture is heated to boiling for about 2 hours in an apparatus provided with a reflux condenser. When cool the yellow precipitate is filtered off and washed out with alcohol and water. The alkylated dyestuff is identical with the dyestuff of the first paragraph of Example 5.

*Example 7*

10 parts of 1-chloro-anthraquinone-4-carboxylic-acid-α-anthraquinone amide are mixed with 50 parts of pyridine, 50 parts of xylene and 4 parts of hydrazine-hydrate and the mixture is heated for about half an hour in an apparatus provided with a reflux condenser. The new dyestuff thus formed is filtered off, washed out. It corresponds probably to the formula:

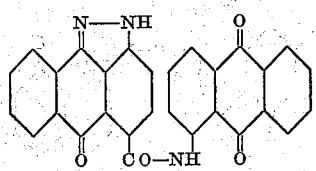

It dyes cotton from a red like claret violet shades turning to a full orange when exposed to the air and acidulated.

We claim:—

1. A process for manufacturing new vat dyestuffs which process comprises condensing a pyrazolanthrone-2-carboxylic acid halide of the formula:

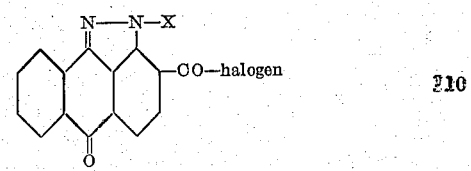

wherein X means hydrogen or an alkyl-group with a cyclic ketone compound containing at least one free amino-group and at least three condensed benzene nuclei.

2. A process for manufacturing new vat dyestuffs which comprises condensing a pyrazolanthrone-2-carboxylic acid halide of the formula:

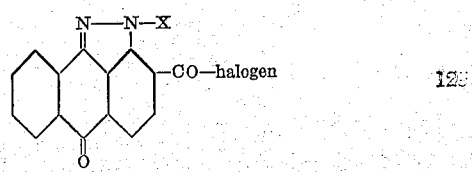

wherein X means hydrogen or an alkyl-group with an aminoanthraquinone compound.

3. As new compounds vat dyestuffs corresponding probably to the general formula:

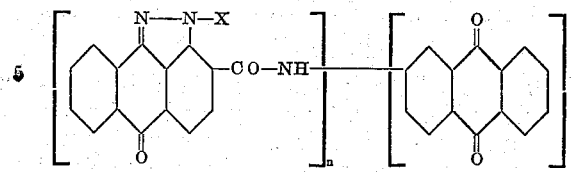

wherein X means hydrogen or an alkyl-group and $n$ the number 1 or 2.

4. As new compounds the vat dyestuffs corresponding probably to the general formula:

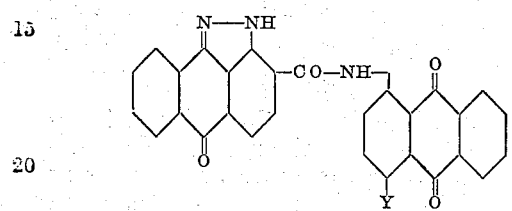

wherein Y means hydrogen or a methoxy-group.

5. As new compound the vat dyestuff corresponding probably to the formula:

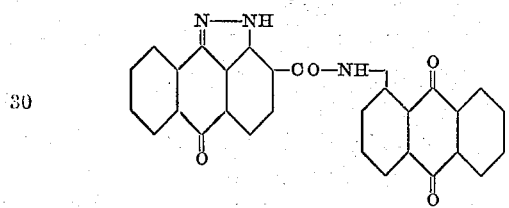

In testimony whereof, we affix our signatures.

GEORG KALISCHER.
HEINRICH RITTER.
HEINZ SCHEYER.
OTTO BAYER.